United States Patent
Takahashi et al.

(10) Patent No.: US 12,148,918 B2
(45) Date of Patent: Nov. 19, 2024

(54) POSITIVE ELECTRODE ACTIVE MATERIAL POWDER, POSITIVE ELECTRODE, LITHIUM ION BATTERY, AND METHOD OF PRODUCING POSITIVE ELECTRODE

(71) Applicant: Prime Planet Energy & Solutions, Inc., Tokyo (JP)

(72) Inventors: Keiichi Takahashi, Nishinomiya (JP); Ryo Hanazaki, Kobe (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 149 days.

(21) Appl. No.: 17/492,680

(22) Filed: Oct. 4, 2021

(65) Prior Publication Data
US 2022/0109141 A1  Apr. 7, 2022

(30) Foreign Application Priority Data
Oct. 5, 2020 (JP) .................................. 2020-168291

(51) Int. Cl.
*H01M 4/36* (2006.01)
*H01M 4/02* (2006.01)
(Continued)

(52) U.S. Cl.
CPC ......... *H01M 4/364* (2013.01); *H01M 4/0404* (2013.01); *H01M 4/0435* (2013.01);
(Continued)

(58) Field of Classification Search
CPC ...... H01M 4/131; H01M 4/364; H01M 4/485; H01M 4/505; H01M 4/525; H01M 4/1391;
(Continued)

(56) References Cited

U.S. PATENT DOCUMENTS

2008/0296740 A1* 12/2008 Kawano .............. H01L 23/3192
257/E23.002
2010/0081055 A1* 4/2010 Konishi ............ H01M 10/0525
429/223

(Continued)

FOREIGN PATENT DOCUMENTS

CN 107004849 A 8/2017
JP 2003217582 A 7/2003
(Continued)

OTHER PUBLICATIONS

KR 20200092413 A (2020)—Machine Translation (Year: 2023).*
(Continued)

*Primary Examiner* — Mayla Gonzalez Ramos
*Assistant Examiner* — Bethany C Garcia
(74) *Attorney, Agent, or Firm* — HAUPTMAN HAM, LLP

(57) ABSTRACT

A positive electrode active material powder includes a first particle group and a second particle group. The first particle group consists of a plurality of first particles. Each of the first particles includes 1 to 10 single-particles. The second particle group consists of a plurality of second particles. Each of the second particles includes an aggregated particle. The aggregated particle is formed by aggregation of 50 or more primary particles. The positive electrode active material powder has a flow function coefficient of more than or equal to 2.9. The flow function coefficient is a ratio of a maximum principal stress to a uniaxial collapse stress. The uniaxial collapse stress and the maximum principal stress are measured by a direct shear test for powders.

16 Claims, 4 Drawing Sheets

(51) Int. Cl.
*H01M 4/04* (2006.01)
*H01M 4/131* (2010.01)
*H01M 4/1391* (2010.01)
*H01M 4/505* (2010.01)
*H01M 4/525* (2010.01)
*H01M 4/66* (2006.01)
*H01M 10/0525* (2010.01)

(52) U.S. Cl.
CPC ......... *H01M 4/131* (2013.01); *H01M 4/1391* (2013.01); *H01M 4/505* (2013.01); *H01M 4/525* (2013.01); *H01M 4/662* (2013.01); *H01M 10/0525* (2013.01); *H01M 2004/021* (2013.01); *H01M 2004/028* (2013.01)

(58) Field of Classification Search
CPC ........... H01M 2004/021; H01M 4/366; H01M 4/0404; H01M 4/0435; H01M 4/02; H01M 4/043; H01M 2004/027; H01M 2004/028; C01P 2004/51; C01P 2004/53; C01P 2004/60–64; C01P 2006/11; C01P 2006/20; C01P 2002/78; C01P 2004/50; C01P 2006/82; Y02E 60/10; B22F 10/34; B01J 2208/00699; C01G 53/50; C01G 53/42; C01G 53/00; C01G 53/006; C01G 53/04; C01G 51/42; C01G 51/50; Y02P 70/50; Y02T 10/70

See application file for complete search history.

(56) References Cited

U.S. PATENT DOCUMENTS

| | | |
|---|---|---|
| 2013/0149604 A1 | 6/2013 | Fujiki et al. |
| 2018/0183039 A1 | 6/2018 | Koga et al. |
| 2020/0083524 A1* | 3/2020 | Baek ............... H01M 4/587 |
| 2020/0381727 A1* | 12/2020 | Kumakura ......... H01M 4/505 |
| 2020/0388830 A1* | 12/2020 | Lee .................. H01M 4/505 |
| 2021/0265627 A1 | 8/2021 | Hiratsuka |

FOREIGN PATENT DOCUMENTS

| | | | |
|---|---|---|---|
| JP | 2013065468 A | 4/2013 | |
| JP | 2013120724 A | 6/2013 | |
| JP | 2017110244 A | 6/2017 | |
| JP | 2017191707 A | 10/2017 | |
| JP | 2020087879 A | 6/2020 | |
| KR | 20200092413 A * | 8/2020 | ............. C01G 53/44 |
| WO | WO-2019151834 A1 * | 8/2019 | ............. C01G 53/50 |
| WO | 2020003642 A1 | 1/2020 | |

OTHER PUBLICATIONS

WO 2019151834 A1 (2019)—Machine Translation (Year: 2023).*
Schulze D., "Powders and Bulk Solids: Behavior, Characterization, Storage, and Flow," 2008, p. 41-47; 215-216. (Year: 2008).*

* cited by examiner

POSITIVE ELECTRODE ACTIVE MATERIAL POWDER, POSITIVE ELECTRODE, LITHIUM ION BATTERY, AND METHOD OF PRODUCING POSITIVE ELECTRODE

This nonprovisional application is based on Japanese Patent Application No. 2020-168291 filed on Oct. 5, 2020, with the Japan Patent Office, the entire contents of which are hereby incorporated by reference.

BACKGROUND OF THE INVENTION

Field of the Invention

The present disclosure relates to a positive electrode active material powder, a positive electrode, a lithium ion battery, and a method of producing the positive electrode.

Description of the Background Art

Japanese Patent Laying-Open No. 2020-087879 discloses that a lithium metal composite oxide powder has two or more peaks in a circularity distribution.

SUMMARY OF THE INVENTION

In a lithium ion battery, a positive electrode has been required to have a high density. The positive electrode includes a positive electrode active material layer and a positive electrode substrate. The positive electrode active material layer includes a positive electrode active material powder. The positive electrode active material layer is formed by applying a positive electrode slurry onto a surface of the positive electrode substrate. The positive electrode substrate includes an aluminum (Al) alloy foil.

By causing the positive electrode to pass between two rotating rolls, the positive electrode is rolled to compress the positive electrode active material layer. During the rolling, the positive electrode active material layer and the positive electrode substrate are elongated. When pressing force during the rolling is increased to increase the density of the positive electrode active material layer, the elongation of the positive electrode substrate becomes large, with the result that the positive electrode substrate becomes brittle. As a result, the positive electrode may be broken during, for example, roll-to-roll transfer.

It is considered that by providing the positive electrode active material powder with a high packing characteristic, the positive electrode active material layer can be compressed to have a high density while suppressing elongation of the positive electrode substrate during the rolling.

An object of the present disclosure is to improve a packing characteristic of a positive electrode active material powder.

Hereinafter, the technical configuration, function and effect of the present disclosure will be described. However, the mechanism of the function of the present disclosure includes a presumption. The scope of claims is not limited by whether or not the mechanism of the function is correct.

[1] A positive electrode active material powder is for a lithium ion battery.

The positive electrode active material powder includes: a first particle group; and a second particle group.

The first particle group consists of a plurality of first particles. Each of the first particles includes 1 to 10 single-particles. Each of the single-particles has a first maximum diameter of more than or equal to 0.5 µm. The first maximum diameter represents a distance between two most distant points on a contour line of the single-particle.

The second particle group consists of a plurality of second particles. Each of the second particles includes an aggregated particle. The aggregated particle is formed by aggregation of 50 or more primary particles. Each of the primary particles have a second maximum diameter of less than 0.5 µm. The second maximum diameter represents a distance between two most distant points on a contour line of the primary particle.

The positive electrode active material powder has a flow function coefficient of more than or equal to 2.9. The flow function coefficient is a ratio of a maximum principal stress to a uniaxial collapse stress. The uniaxial collapse stress and the maximum principal stress are measured by a direct shear test for powders.

Conventionally, the Carr's flowability index has been commonly used as an index of a packing characteristic of a positive electrode active material powder. The Carr's flowability index is found in accordance with the following four items: angle of repose, compressibility, spatula angle, and cohesion (or uniformity). For each item, no strong external force is applied to the powder during the measurement. During the rolling, the positive electrode active material layer (powder layer) is compressed in the thickness direction while being elongated in the rolling direction. Therefore, it is considered that external forces such as compressive force, shear force and tensile force are applied to the positive electrode active material powder during the rolling. The Carr's flowability index may not reflect a packing behavior of the positive electrode active material powder during the rolling.

According to a new finding of the present disclosure, a flow function coefficient ($ff_c$) excellently represents the packing behavior of the positive electrode active material powder during the rolling. The $ff_c$ is a ratio of a maximum principal stress ($\sigma_1$) to a uniaxial collapse stress ($f_c$). The $ff_c$ is measured by the direct shear test for powders. In the direct shear test, powder is consolidated in the vertical direction to form a powder layer. Shear stress is gradually applied in the horizontal direction with vertical stress being applied to the powder layer. A collapse behavior of the powder layer on this occasion is measured.

As the value of the $ff_c$ of the positive electrode active material powder is larger, the packing characteristic during the rolling is expected to be higher. In particular, when the $ff_c$ is more than or equal to 2.9, the packing characteristic during the rolling is expected to be improved.

The positive electrode active material powder of the present disclosure includes two types of particles each having a specific structure. That is, the positive electrode active material powder includes the first particle group and the second particle group. The first particle group includes the single-particles. Each of the single-particles is a primary particle grown to be relatively large. The second particle group includes the aggregated particles. Each of the aggregated particles is a secondary particle in which relatively small primary particles are aggregated. By the combination of the first particle group (single-particles) and the second particle group (aggregated particles), the $ff_c$ tends to be increased. Further, the $ff_c$ of more than or equal to 2.9 can be realized by adjusting a mixing condition or the like.

[2] In the positive electrode active material powder according to [1], the single-particle may include, for example, a first lamellar metal oxide.

The first lamellar metal oxide is represented by the following formula (1):

$$Li_{1-a1}Ni_{x1}Me^1_{1-x1}O_2 \quad (1).$$

In the formula (1),

"a1" satisfies a relation of "−0.3≤a1≤0.3".

"x1" satisfies a relation of "0.6≤x1<1.0".

"$Me^1$" represents at least one selected from a group consisting of Co, Mn, Al, Zr, Ti, V, Cr, Fe, Cu, Zn, Mo, Sn, Ge, Nb, and W.

The primary particles may include, for example, a second lamellar metal oxide.

The second lamellar metal oxide is represented by the following formula (2):

$$Li_{1-a2}Ni_{x2}Me^2_{1-x2}O_2 \quad (2).$$

In the formula (2),

"a2" satisfies a relation of "−0.3≤a2≤0.3".

"x2" satisfies a relation of "0.7≤x2≤1.0".

"$Me^2$" represents at least one selected from the group consisting of Co, Mn, Al, Zr, Ti, V, Cr, Fe, Cu, Zn, Mo, Sn, Ge, Nb, and W.

Since the single-particles and the primary particles (aggregated particles) have the above-described chemical compositions, it is expected to improve an energy density, for example.

[3] A positive electrode is for a lithium ion battery. The positive electrode includes: a positive electrode active material layer; and a positive electrode substrate. The positive electrode active material layer is formed on a surface of the positive electrode substrate. The positive electrode active material layer includes the positive electrode active material powder according to [1] or [2]. The positive electrode substrate includes an aluminum alloy foil. The positive electrode substrate may have a tensile strength of 250 MPa to 350 MPa. 30 to 50 crystal grain boundaries may exist on average in a thickness direction of the aluminum alloy foil.

[4] The lithium ion battery includes the positive electrode according to [3].

The lithium ion battery of the present disclosure is expected to have a high energy density. This is presumably because the positive electrode active material powder of the present disclosure has a high packing characteristic. Further, in the lithium ion battery of the present disclosure, for example, cycle durability is also expected to be improved. This is presumably because the second particles (aggregated particles) are less cracked in the positive electrode. For example, if the second particles are cracked during the rolling, the specific surface area (i.e., reaction area) of the positive electrode active material may be increased excessively to result in decreased cycle durability. Since the positive electrode active material powder of the present disclosure exhibits a high packing characteristic during the rolling, it is expected to reduce cracks of the second particles.

[5] According to a method of producing a positive electrode, a positive electrode for a lithium ion battery is produced.

The method of producing the positive electrode includes (A), (B) and (C) as follows.

(A) A positive electrode slurry including the positive electrode active material powder according to [1] or [2] is prepared.

(B) A positive electrode active material layer is formed by applying the positive electrode slurry onto a surface of a positive electrode substrate.

(C) The positive electrode is produced by rolling the positive electrode active material layer and the positive electrode substrate.

In the method of producing the positive electrode according to the present disclosure, it is considered that the positive electrode active material layer can be compressed to have a high density while suppressing elongation of the positive electrode substrate during the rolling. This is presumably because the positive electrode active material powder exhibits a high packing characteristic during the rolling.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
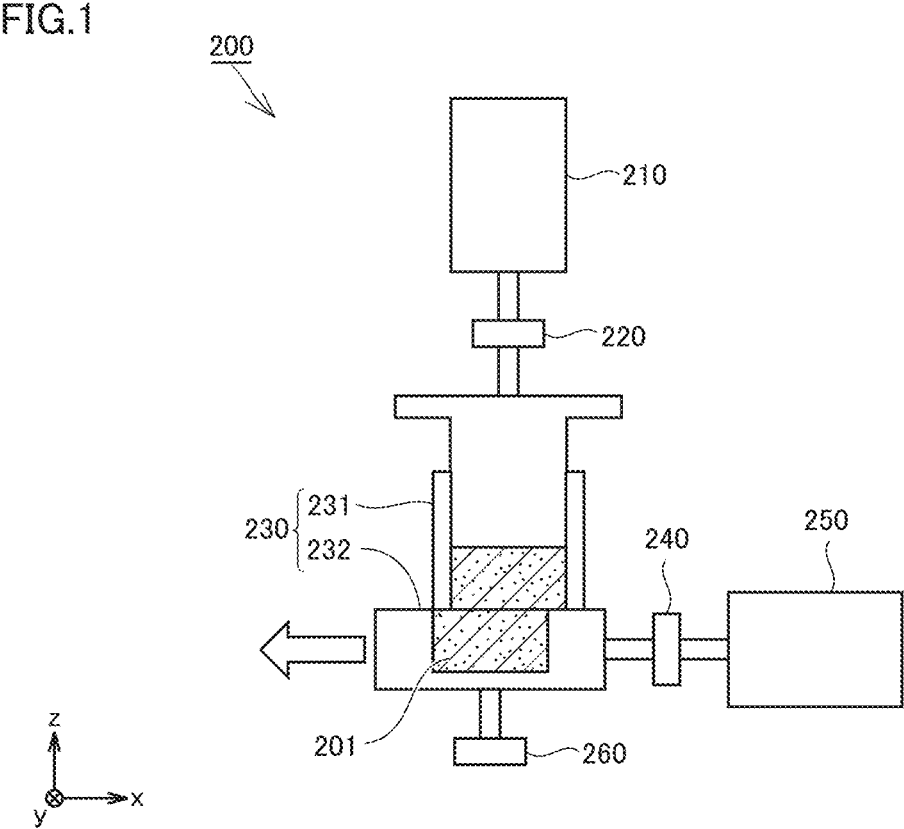
FIG. 1 is a first explanatory diagram of a direct shear test for powders.

Hereinafter, an embodiment of the present disclosure (hereinafter, also referred to as "the present embodiment") will be described. However, the scope of claims is not limited by the description below.

In the present specification, a numerical range such as "1 to 10" includes the lower and upper limit values unless otherwise stated particularly. For example, the description "1 to 10" represents a numerical range of "more than or equal to 1 and less than or equal to 10". Further, numerical values freely selected from the numerical range may be employed as new lower and upper limit values. For example, a new numerical range may be set by freely combining a numerical value described in an example with a numerical value falling within the numerical range.

In the present specification, the description "consist essentially of" indicates that an additional component can be included in addition to an essential component to such an extent that the object of the present disclosure is not hindered. For example, a normally imaginable component in the technical field (such as an inevitable impurity) may be included as an additional component.

In the present specification, when a compound is expressed by a stoichiometric composition formula such as "$LiCoO_2$", the stoichiometric composition formula merely indicates a representative example. For example, when a lithium cobaltate is expressed as "$LiCoO_2$", the lithium cobaltate is not limited to a composition ratio of "Li/Co/O=1/1/2" unless otherwise stated particularly, and can include Li, Co, and O at any composition ratio. The composition ratio may be non-stoichiometric.

<Positive Electrode Active Material Powder>

The positive electrode active material powder of the present embodiment is for a lithium ion battery. Details of the lithium ion battery will be described later. The positive electrode active material powder may have a D50 of, for example, 5 μm to 25 μm. The "D50" in the present embodiment represents a particle size corresponding to a cumulative particle volume of 50% from the smallest particle size with respect to the total particle volume in a volume-based particle size distribution. The volume-based particle size distribution can be measured by a laser diffraction type particle size distribution measurement device. The positive electrode active material powder may have a D50 of 8 μm to 12 μm, for example.

The positive electrode active material powder may have, for example, a BET specific surface area of 0.2 μm²/g to 5.0 μm²/g. The "BET specific surface area" in the present embodiment is measured by a BET multipoint method.

«Particle Structure»

The positive electrode active material powder includes a first particle group and a second particle group. The positive electrode active material powder may consist essentially of the first particle group and the second particle group. The positive electrode active material powder may consist of the first particle group and the second particle group. The first particle group is a collection of first particles. The second particle group is a collection of second particles. Each first particle have a particle structure different from that of each second particle. It is considered that the coexistence of the two types of particles having different particle structures contributes to an increase in $ff_c$.

(First Particle Group)

The first particle group consists of the plurality of first particles. Each of the first particles may have any shape. The first particle may have a spherical shape, a columnar shape, a lump-like shape, or the like, for example. Each of the first particles includes 1 to 10 single-particles. Each of the single-particles is a primary particle grown to be relatively large. The single-particle may have any shape. The single-particle may have a spherical shape, a columnar shape, a lump-like shape, or the like, for example. A single-particle may solely form a first particle. 2 to 10 single-particles may be aggregated to form a first particle.

The number of the single-particles included in the first particle is measured in a SEM (scanning electron microscope) image of the first particle. The magnification of the SEM image is appropriately adjusted in accordance with the size of the particle. The magnification of the SEM image may be, for example, 10000× to 30000×.

It should be noted that, for example, when two single-particles are overlapped with each other in the SEM image of the particle, the particle behind the other may not be confirmed. However, in the present embodiment, the number of single-particles that can be confirmed in the SEM image is regarded as the number of the single-particles included in the first particle. The same applies to an aggregated particle described later. The first particle may consist essentially of 1 to 10 single-particles, for example. The first particle may consist of 1 to 10 single-particles, for example. The first particle may consist of 1 to 5 single-particles, for example. The first particle may consist of 1 to 3 single-particles, for example. The first particle may consist of 1 single-particle, for example.

The "single-particle" in the present embodiment represents a particle in which no grain boundary can be confirmed in its external appearance in the SEM image of the particle and which has a first maximum diameter of more than or equal to 0.5 μm. The first maximum diameter represents a distance between two most distant points on a contour line of the single-particle. In the present embodiment, the "contour line of the particle" may be confirmed in a two-dimensional projection image of the particle, or may be confirmed in a cross sectional image of the particle. The contour line of the particle may be confirmed, for example, in a SEM image of the powder or in a cross sectional SEM image of the particle.

The single-particle may have a first maximum diameter of, for example, 1 μm to 7 μm. The single-particle may have a first maximum diameter of, for example, 2 μm to 5 μm. The single particle may have a first maximum diameter of, for example, 2.5 μm to 3.8 μm. The average value of the first maximum diameters may be, for example, 1 μm to 5 μm. The average value is calculated from the first maximum diameters of 100 single-particles. The 100 single-particles are extracted randomly.

(Second Particle Group)

The second particle group consists of the plurality of second particles. Each of the second particles may have any shape. The second particle may have a spherical shape, a columnar shape, a lump-like shape, or the like, for example. Each of the second particles includes an aggregated particle. The second particle may consist essentially of an aggregated particle, for example. The second particle may consist of an aggregated particle, for example. The aggregated particle is formed by aggregation of 50 or more primary particles. The number of the primary particles included in the aggregated particle is measured in a SEM image of the aggregated particle. The magnification of the SEM image may be, for example, 10000× to 30000×. The aggregated particle may be formed by aggregation of 100 or more primary particles, for example. There is no upper limit for the number of the primary particles in the aggregated particle. The aggregated particle may be formed by aggregation of 10000 or less primary particles, for example. The aggregated particle may be formed by aggregation of 1000 or less primary particles, for example. Each of the primary particles may have any shape. The primary particle may have a spherical shape, a columnar shape, a lump-like shape, or the like, for example.

The "primary particle" in the present embodiment represents a particle in which no grain boundary can be confirmed in its external appearance in the SEM image of the particle and which has a second maximum diameter of less than 0.5 μm. That is, the primary particle included in the second particle has a smaller particle size than that of the single-particle included in the first particle. The second maximum diameter represents a distance between two most distant points on a contour line of the primary particle. The primary particle may have a second maximum diameter of 0.05 μm to 0.2 μm, for example. When each of 10 or more primary particles randomly extracted from the SEM image of one aggregated particle has a second maximum diameter of 0.05 μm to 0.2 μm, all the primary particles included in the aggregated particle are regarded as each having a second maximum diameter of 0.05 μm to 0.2 μm. Each of the primary particles may have a second maximum diameter of, for example, 0.1 μm to 0.2 μm. The average value of the second maximum diameters may be 0.1 μm to 0.3 μm, for example. The average value is calculated from the second maximum diameters of 100 primary particles. The 100 primary particles are extracted randomly.

It should be noted that the aggregated particle may further include a primary particle having a maximum diameter of more than or equal to 0.5 μm as long as the aggregated particle includes 50 or more primary particles each having a maximum diameter of less than 0.5 μm.

«Chemical Composition»

Each of the first particles (single-particles) and the second particles (primary particles) in the present embodiment can have any crystal structure. Each of the single-particle and the primary particle may independently have a lamellar structure, a spinel structure, an olivine structure, or the like.

Each of the first particle (single-particle) and the second particle (primary particle) in the present embodiment can independently have any chemical composition. The first particle (single-particle) may have the same chemical composition as that of the second particle (primary particle). The first particle (single-particle) may have a chemical composition different from that of the second particle (primary particle).

For example, each of the single-particle and the primary particle may independently include at least one selected from a group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. Here, for example, a description such as "(NiCoMn)" in a composition formula such as "$Li(NiCoMn)O_2$" indicates that the total of the composition ratios in the parentheses is 1.

For example, both the first particle (single-particle) and the second particle (primary particle) may include a lamellar metal oxide. The lamellar metal oxide has a lamellar structure. The lamellar metal oxide may include, for example, Ni. The lamellar metal oxide including Ni can have a large specific capacity.

The single-particle may include, for example, a first lamellar metal oxide.

The first lamellar metal oxide is represented by the following formula (1):

$$Li_{1-a1}Ni_{x1}Me^1_{1-x1}O_2 \quad (1).$$

In the formula (1),

"a1" satisfies a relation of "$-0.3 \leq a1 \leq 0.3$".

"x1" satisfies a relation of "$0.6 \leq x1 < 1.0$".

"$Me^1$" represents at least one selected from a group consisting of Co, Mn, Al, Zr, Ti, V, Cr, Fe, Cu, Zn, Mo, Sn, Ge, Nb, and W.

The primary particle may include, for example, a second lamellar metal oxide.

The second lamellar metal oxide is represented by the following formula (2):

$$Li_{1-a2}Ni_{x2}Me^2_{1-x2}O_2 \quad (2).$$

In the formula (2),

"a2" satisfies a relation of "$-0.3 \leq a2 \leq 0.3$".

"x2" satisfies a relation of "$0.7 \leq x2 \leq 1.0$".

"$Me^2$" represents at least one selected from the group consisting of Co, Mn, Al, Zr, Ti, V, Cr, Fe, Cu, Zn, Mo, Sn, Ge, Nb, and W.

In the formulae (1) and (2), a relation of "x1<x2" may be satisfied, for example.

For example, each of the single-particle and the primary particle may independently include at least one selected from a group consisting of $LiNi_{0.8}Co_{0.1}Mn_{0.1}O_2$, $LiNi_{0.7}Co_{0.2}Mn_{0.1}O_2$, $LiNi_{0.7}Co_{0.1}Mn_{0.2}O_2$, $LiNi_{0.6}Co_{0.3}Mn_{0.1}O_2$, $LiNi_{0.6}Co_{0.2}Mn_{0.2}O_2$, and $LiNi_{0.6}Co_{0.1}Mn_{0.3}O_2$.

For example, both the single-particle and the primary particle may consist essentially of $LiNi_{0.8}Co_{0.1}Mn_{0.1}O_2$. For example, both the single-particle and the primary particle may consist essentially of $LiNi_{0.7}Co_{0.2}Mn_{0.1}O_2$. For example, both the single-particle and the primary particle may consist essentially of $LiNi_{0.6}Co_{0.2}Mn_{0.2}O_2$. For example, the single-particle may consist essentially of $LiNi_{0.6}Co_{0.2}Mn_{0.2}O_2$ and the primary particle may consist essentially of $LiNi_{0.7}Co_{0.2}Mn_{0.1}O_2$. For example, the single-particle may consist essentially of $LiNi_{0.6}Co_{0.2}Mn_{0.2}O_2$ and the primary particle may consist essentially of $LiNi_{0.8}Co_{0.1}Mn_{0.1}O_2$.

(Surface Coating)

Each of the first particle and the second particle may independently include a coating film on its surface. Since the surface of each particle is coated with the coating film, the $ff_c$ of the positive electrode active material powder may be increased. The coating film may include, for example, an oxide, a carbide, a nitride, a boride, a phosphide, a halide, or the like. The coating film may include, for example, a metal oxide or the like. The metal component of the coating film may include, for example, at least one selected from a group consisting of Ti, Al, W, Zr, Mg, Nb, and Mo.

«Flow Function Coefficient ($ff_c$)»

The positive electrode active material powder of the present embodiment has an $ff_c$ of more than or equal to 2.9. When the $ff_c$ is more than or equal to 2.9, the positive electrode active material powder is expected to exhibit a high packing characteristic during rolling. As the $ff_c$ is larger, the packing characteristic is expected to be improved. The positive electrode active material powder may have an $ff_c$ of more than or equal to 3.0, for example. The positive electrode active material powder may have an $ff_c$ of more than or equal to 3.5, for example. The positive electrode active material powder may have an $ff_c$ of more than or equal to 4.3, for example. The positive electrode active material powder may have an $ff_c$ of more than or equal to 4.7, for example. The positive electrode active material powder may have an $ff_c$ of more than or equal to 4.8, for example. The positive electrode active material powder may have an $ff_c$ of more than or equal to 5.1, for example. The positive electrode active material powder may have an $ff_c$ of more than or equal to 8.2, for example. The $ff_c$ may have any upper limit value. The positive electrode active material powder may have an $ff_c$ of less than or equal to 8.2, for example.

(Method of Measuring $ff_c$)

The $ff_c$ is measured by a direct shear test for powders. A constant-volume shear test device is prepared. For example, a powder-layer shear measurement device "NS-S500 type" manufactured by Nano Seeds Corporation or the like may be prepared. A device having a function equivalent to that of the foregoing device may be prepared.

FIG. 1 is a first explanatory diagram of the direct shear test for powders.

A test device 200 includes a servo cylinder 210, a first load cell 220, a sample cell 230, a second load cell 240, a linear actuator 250, and a third load cell 260. The powder (measurement target) is provided in sample cell 230. In this way, a powder layer 201 is formed. Sample cell 230 has a cylindrical shape. Sample cell 230 includes an upper cell 231 and a lower cell 232. Sample cell 230 is divided into upper cell 231 and lower cell 232.

Servo cylinder 210 applies, to the powder, a load in a vertical direction (z axis direction). Thus, vertical stress is generated to consolidate powder layer 201. Upper cell 231 is fixed. Linear actuator 250 moves lower cell 232 in a horizontal direction (x axis direction). Thus, powder layer 201 undergoes shear collapse.

Figure 2:
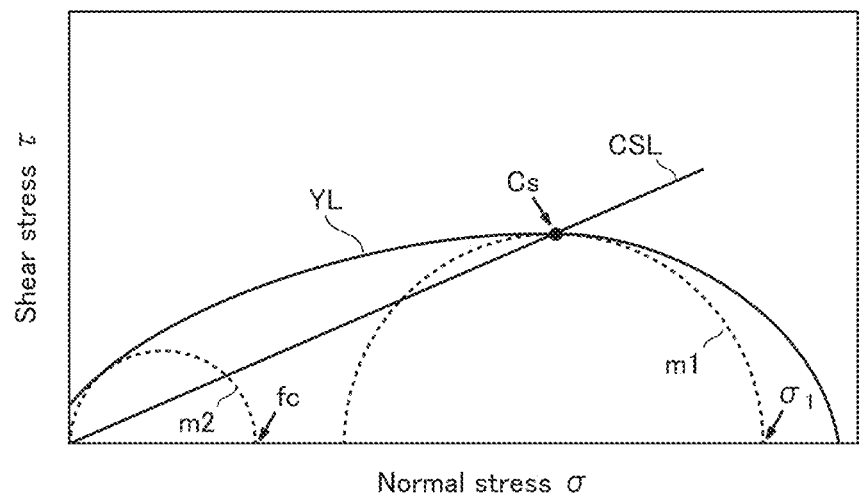
FIG. 2 is a second explanatory diagram of the direct shear test for powders.

FIG. 2 is a second explanatory diagram of the direct shear test for powders.

Uniaxial collapse stress ($f_c$) and maximum principal stress ($\sigma_1$) are derived from vertical stress ($\sigma$) and shear stress ($\tau$) in the direct shear test for powders. In the orthogonal coordinates of FIG. 2, the vertical stress ($\alpha$) is indicated in the horizontal axis, and the shear stress ($\tau$) is indicated in the vertical axis. First, a yield locus (YL) is drawn. The shear stress ($\tau$) is gradually exerted onto an arbitrary plane in powder layer 201 in the horizontal direction with the vertical stress ($\alpha$) being applied to the plane. Due to the shear stress ($\tau$), the plane in powder layer 201 starts to undergo collapse. This is a critical stress state. The vertical stress ($\sigma$) and the shear stress ($\tau$) in the critical stress state are plotted. In this way, the yield locus (YL) is drawn. Then, a critical state line (CSL) is drawn. After the shear collapse, the shear stress (i) is changed temporarily but finally has a constant value. The shear stress ($\tau$) having the constant value as well as the vertical stress (a) on that occasion are plotted. In this way, the critical state line (CSL) is drawn. The critical state line (CSL) is a straight line extending through the origin.

An intersection point between the yield locus (YL) and the critical state line (CSL) represents a critical state (Cs). A Mohr's stress circle (m1) is drawn to extend through the critical state (Cs) and be tangent to the yield locus (YL). Of intersection points between the Mohr's stress circle (m1) and the horizontal axis, the one having a larger value is the maximum principal stress ($\sigma_1$). A Mohr's stress circle (m2) is drawn to extend through the origin and be tangent to the yield locus (YL). An intersection point (other than the origin) between the Mohr's stress circle (m2) and the horizontal axis is the uniaxial collapse stress ($f_c$). The $ff_c$ is calculated by the following formula: "$ff_c = \sigma_1/f_c$". The $ff_c$ is measured three or more times. The arithmetic average value of the three or more results is regarded as the $ff_c$ of the measurement target. The $ff_c$ (average value) is effective up to the first decimal place. The second and subsequent decimal places are rounded off.

The direct shear test for powders is performed in accordance with "JIS Z8835: Direct shear testing method for critical state line (CSL) and wall yield locus (WYL) of powder bed". Specific test conditions are, for example, as follows.

Amount of sample: 10.0 g
Sampling cycle: 10 Hz
Final thickness of powder layer: 5.00 mm
Inner diameter of sample cell: 15 mm
Pressing speed: 0.20 mm/s
Pressing load: 150 N
Lateral sliding speed: 10 μm/s
Measurement time: 280 s
Measurement temperature: 28° C. 1° C.

(Method of Adjusting $ff_c$)

The $ff_c$ is changeable depending on various types of factors. In the present embodiment, the various types of factors are combined to attain an $ff_c$ of more than or equal to 2.9. The above-described particle structure (combination of the single-particles and the aggregated particles) is one of the factors that affect the $ff_c$. Further, for example, the "D50 of each particle group", "BET specific surface area of each particle group", "mixing fraction", "mixing device" and "water content after mixing" can affect the $ff_c$.

i. D50 of Each Particle Group

The first particle group (powder) before mixing may have a D50 of, for example, 1 μm to 5 μm. The second particle group may have a larger D50 than that of the first particle group. The second particle group (powder) before mixing may have a D50 of 8 μm to 16 μm, for example.

ii. BET Specific Surface Area of Each Particle Group

The first particle group (powder) before mixing may have a BET specific surface area of, for example, 0.2 μm²/g to 5.0 μm²/g. The second particle group (powder) before mixing may have a BET specific surface area of, for example, 0.2 μm²/g to 3.0 μm²/g.

iii. Mixing Fraction

The "mixing fraction" in the present embodiment represents the mass fraction of the first particle group with respect to the total of the first particle group and the second particle group. The mixing fraction may be, for example, 20% to 75%. The mixing fraction may be, for example, more than or equal to 25%, more than or equal to 30%, or more than or equal to 50%. The mixing fraction may be, for example, less than or equal to 70%, less than or equal to 65%, or less than or equal to 60%.

iv. Mixing Device

Figure 3:
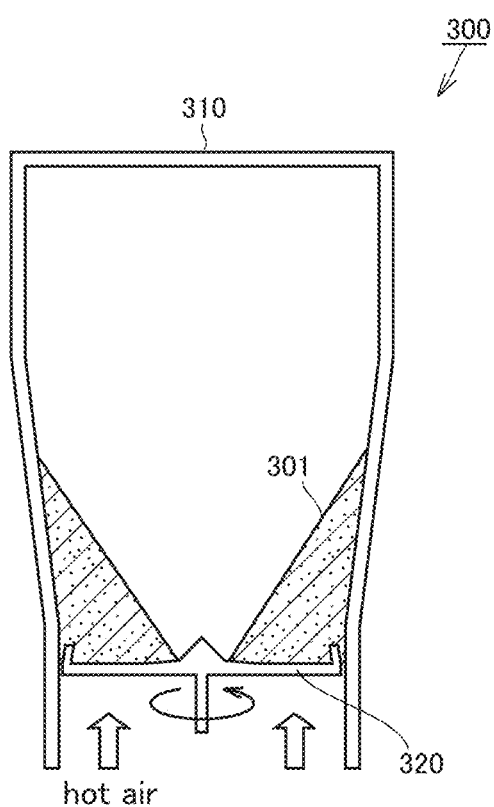
FIG. 3 is a schematic diagram showing an exemplary configuration of a mixing device.

FIG. 3 is a schematic diagram showing an exemplary configuration of the mixing device.

A mixing device 300 is a tumbling fluidized-bed dry mixing device. Mixing device 300 includes a container 310, a stirring blade 320, and an air supply device (not shown). Powder 301 (process target) is introduced into the container. Stirring blade 320 stirs and mixes powder 301. In this way, the positive electrode active material powder is prepared. The air supply device supplies air into container 310. The temperature of the air can be adjusted. When the first particle group and the second particle group are mixed in the airflow in accordance with the tumbling/fluidized-bed process, the $ff_c$ tends to be increased. Further, when the temperature of the supplied air is high, the $ff_c$ tends to be increased. The temperature of the supplied air may be, for example, a normal temperature to 150° C. The "normal temperature" in the present embodiment represents a range of 20° C.±15° C. The temperature of the supplied air may be, for example, 80° C. to 150° C. The temperature of the supplied air may be, for example, 120° C. to 150° C. A mixing time may be, for example, 1 min to 1 hour. The mixing time may be, for example, 10 min to 30 min.

v. Water Content

The $ff_c$ tends to be increased by mixing the first particle group and the second particle group to attain a water content of less than or equal to 1070 ppm in the positive electrode active material powder after mixing. The "water content" in the present embodiment represents the mass fraction of water in the positive electrode active material powder. The water content may be, for example, less than or equal to 970 ppm, less than or equal to 920 ppm, less than or equal to 760 ppm, less than or equal to 730 ppm, less than or equal to 720 ppm, less than or equal to 700 ppm, less than or equal to 690 ppm, or less than or equal to 680 ppm. The water content may have any lower limit value. The water content may be more than or equal to 680 ppm, for example. The water content is measured by a Karl Fischer moisture meter. Measurement conditions are, for example, as follows.

Heating temperature: 270° C.
Measurement time: 30 min

<Lithium Ion Battery>

Figure 4:
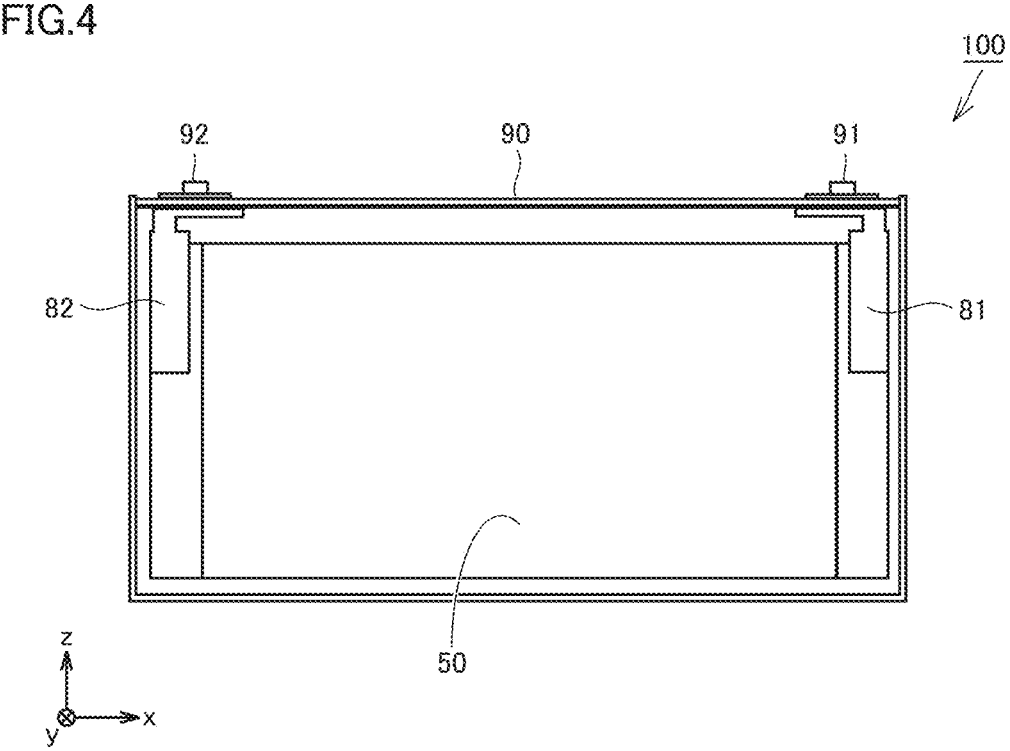
FIG. 4 is a schematic diagram showing an exemplary lithium ion battery in the present embodiment.

FIG. 4 is a schematic diagram showing an exemplary lithium ion battery in the present embodiment.

A battery 100 is a lithium ion battery. Battery 100 can have a high energy density. This is because battery 100 includes the above-described positive electrode active material powder. Battery 100 can be used for any purpose of use. Battery 100 may be used as a main electric power supply or a motive power assisting electric power supply in an electrically powered vehicle, for example. A plurality of batteries 100 may be coupled to form a battery module or a battery pack.

Battery 100 includes an exterior package 90. Exterior package 90 has a prismatic shape (flat rectangular parallelepiped shape). However, the prismatic shape is exemplary. Exterior package 90 may have, for example, a cylindrical shape or a pouch shape. Exterior package 90 may be composed of, for example, an Al alloy. Exterior package 90 stores an electrode assembly 50 and an electrolyte (not shown). Electrode assembly 50 is connected to a positive electrode terminal 91 by a positive electrode current collecting member 81. Electrode assembly 50 is connected to a negative electrode terminal 92 by a negative electrode current collecting member 82.

Figure 5:
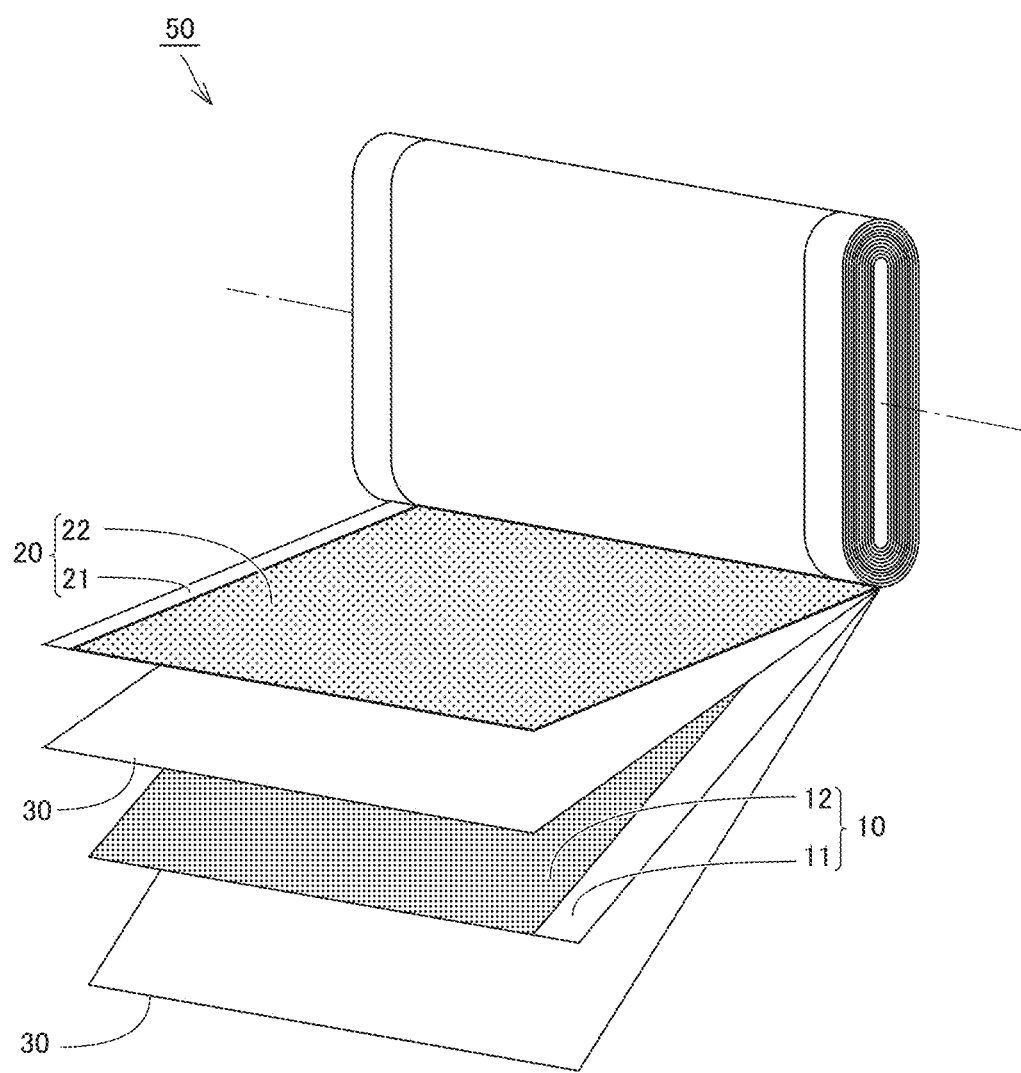
FIG. 5 is a schematic diagram showing an exemplary electrode assembly in the present embodiment.

FIG. 5 is a schematic diagram showing an exemplary electrode assembly in the present embodiment.

Electrode assembly 50 is of a wound type. Electrode assembly 50 includes a positive electrode 10, separator(s) 30, and a negative electrode 20. That is, battery 100 includes positive electrode 10. Each of positive electrode 10, separator(s) 30, and negative electrode 20 is a sheet in the form of a strip. Electrode assembly 50 may include two separators 30. Electrode assembly 50 is formed by layering positive electrode 10, separator 30, and negative electrode 20 in this order and winding them spirally. Electrode assembly 50 is shaped to have a flat shape after the winding. It should be noted that the wound type is exemplary. Electrode assembly 50 may be, for example, of a stack type.

«Positive Electrode»

Positive electrode 10 includes a positive electrode active material layer 12 and a positive electrode substrate 11. Positive electrode active material layer 12 is formed on a surface of positive electrode substrate 11. Positive electrode active material layer 12 may be formed directly on the surface of positive electrode substrate 11. For example, an intermediate layer (not shown) may be formed between positive electrode active material layer 12 and positive electrode substrate 11. In the present embodiment, also when the intermediate layer is formed, positive electrode active material layer 12 is regarded as being formed on the surface of positive electrode substrate 11. The intermediate layer may have a thickness smaller than that of positive electrode active material layer 12. The intermediate layer may include, for example, a conductive material, an insulating material, or the like. Positive electrode active material layer 12 may be formed only on one side of positive electrode substrate 11. Positive electrode active material layer 12 may be formed on each of the front and rear surfaces of positive electrode substrate 11.

(Positive Electrode Active Material Layer)

Positive electrode active material layer 12 may have a thickness of, for example, 10 μm to 200 μm. Positive electrode active material layer 12 can have a high density. This is presumably because the positive electrode active material powder has a high packing characteristic. Positive electrode active material layer 12 may have, for example, a density of more than or equal to 3.5 g/cm$^3$, a density of more than or equal to 3.6 g/cm$^3$, or a density of more than or equal to 3.7 g/cm$^3$. The density may have any upper limit value. Positive electrode active material layer 12 may have a density of less than or equal to 3.8 g/cm$^3$, for example.

Figure 6:
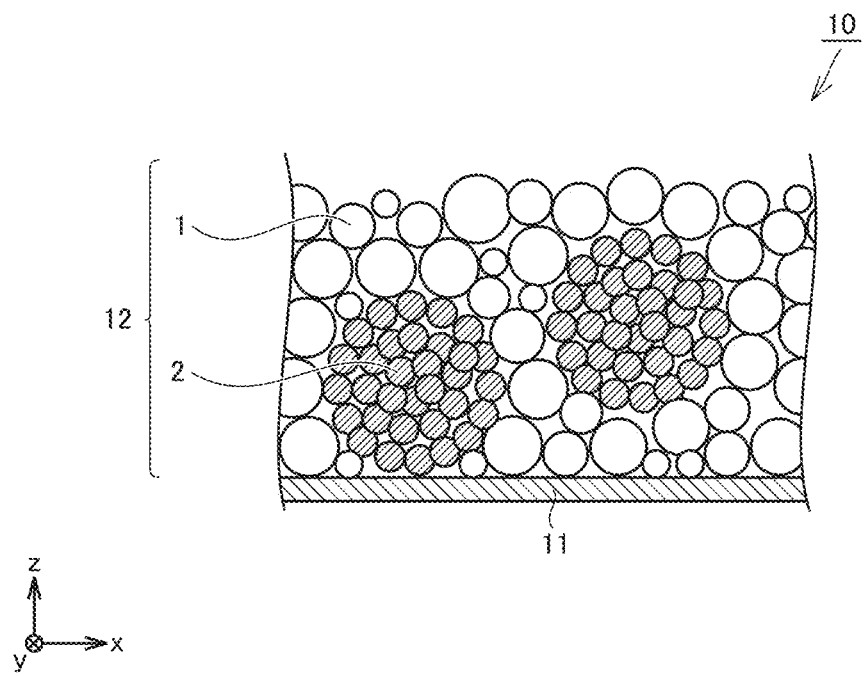
FIG. 6 is a conceptual diagram showing a positive electrode in the present embodiment.

FIG. 6 is a conceptual diagram showing the positive electrode in the present embodiment.

Positive electrode active material layer 12 includes the above-described positive electrode active material powder. The positive electrode active material powder includes first particles 1 and second particles 2. First particles 1 include the single-particles. Second particles 2 include the aggregated particles. First particles 1 and second particles 2 are densely provided. For example, second particles 2 may be distributed in the form of islands in a collection of first particles 1 spread in the form of sea. In addition to the positive electrode active material powder, positive electrode active material layer 12 may further include a conductive material (not shown), a binder (not shown), and the like. The conductive material can include any component. The conductive material may include acetylene black or the like, for example. A blending amount of the conductive material may be, for example, 0.1 part by mass to 10 parts by mass with respect to 100 parts by mass of the positive electrode active material powder. The binder can include any component. For example, the binder may include polyvinylidene difluoride (PVdF) or the like. A blending amount of the binder may be, for example, 0.1 part by mass to 10 parts by mass with respect to 100 parts by mass of the positive electrode active material powder.

(Positive Electrode Substrate)

Positive electrode substrate 11 is an electrically conductive sheet. Positive electrode substrate 11 may have a thickness of, for example, 10 μm to 30 μm. Positive electrode substrate 11 may have a thickness of, for example, 10 μm to 20 μm. Positive electrode substrate 11 may have a thickness of, for example, 10 μm to 15 μm.

Positive electrode substrate 11 may include, for example, an Al alloy foil, a pure Al foil, or the like. Positive electrode substrate 11 may be consist essentially of, for example, the Al alloy foil. Positive electrode substrate 11 may consist of, for example, the Al alloy foil. The Al alloy may be a material having an alloy number in 1000 series, an alloy number in 3000 series, or an alloy number in 8000 series. The alloy number indicates the number defined in "JIS H4000: Aluminium and aluminium alloy sheets, strips and plates".

The Al alloy may be, for example, a material with a small elongation during rolling. When positive electrode substrate 11 is less likely to be elongated, the density of positive electrode active material layer 12 tends to be high. The Al alloy may include, for example, a dispersion-strengthened alloy. For example, an Al alloy having an alloy number in 3000 series is a dispersion-strengthened alloy. The Al alloy in 3000 series is strengthened by Al—Mn-based dispersed particles. The Al alloy in 3000 series tends to have a small elongation during rolling. The alloy number of the Al alloy may be, for example, 3003, 3004, or the like.

(Tensile Strength)

The Al alloy may be, for example, a material having a high tensile strength. When positive electrode substrate 11 has a high tensile strength, the density of positive electrode active material layer 12 tends to be likely to be high. Positive electrode substrate 11 may have a tensile strength of, for example, 250 MPa to 350 MPa. Tensile strength is measured in a tensile test. A sample piece is cut out from positive electrode substrate 11. The sample piece has a planar size of 120 mm in length×15 mm in width. The sample piece is set in a tensile tester. The sample piece is pulled in a long side direction at a rate of 5 mm/min. The sample piece is pulled until the sample piece is broken. The maximum load until the breakage is measured. By dividing the maximum load by the cross sectional area (=width×thickness) of the sample piece, the tensile strength is calculated.

(Average Number of Grain Boundaries)

30 to 50 crystal grain boundaries may exist on average in the thickness direction of the Al alloy foil, for example. Hereinafter, the average value of the crystal grain boundaries is also referred to as "average number of grain boundaries". When the average number of the grain boundaries is 30 to 50, the density of positive electrode active material layer 12 tends to be likely to be high. The number of the grain boundaries is specified by counting the number of the crystal grain boundaries along the thickness direction of the Al alloy foil. The average number of the grain boundaries is an arithmetic average value of the numbers of the grain boundaries. The average number of the grain boundaries is measured in the following procedure.

A cross sectional sample of positive electrode substrate 11 is prepared. The cross sectional sample is observed by a SEM. By the SEM, an electron back scatter diffraction (EBSD) pattern of the cross sectional sample is obtained. By analyzing the EBSD pattern, an EBSD orientation map image is created. In the EBSD orientation map image, a straight line is drawn to extend across the cross sectional sample in parallel with the thickness direction of the cross sectional sample. The number of grain boundaries crossed by the straight line is counted. In this way, the number of the grain boundaries is specified. The number of the grain boundaries is measured at any three or more positions. The arithmetic average value of the three or more results is regarded as the average number of the grain boundaries.

The mechanical characteristics (elongation and tensile strength) of the Al alloy may be improved by distribution of Al—Mn-based dispersed particles. The distribution of the Al—Mn-based dispersed particles can be confirmed in the EBSD orientation map image. The Al—Mn-based dispersed particles may be distributed over the entire region in the thickness direction.

«Negative Electrode»

Negative electrode 20 includes a negative electrode active material layer 22 and a negative electrode substrate 21. Negative electrode substrate 21 can include, for example, a copper foil or the like. Negative electrode active material layer 22 is formed on a surface of negative electrode substrate 21. Negative electrode active material layer 22 includes a negative electrode active material powder. The negative electrode active material powder can include any component. The negative electrode active material powder may include, for example, at least one selected from a group consisting of graphite, soft carbon, hard carbon, Si, SiO, Si-based alloy, Sn, SnO, Sn-based alloy, and $Li_4Ti_5O_2$. In addition to the negative electrode active material powder, negative electrode active material layer 22 may further include a binder or the like. The binder may include, for example, styrene-butadiene rubber (SBR), carboxymethyl cellulose (CMC), or the like.

«Separator»

At least a portion of separator 30 is disposed between positive electrode 10 and negative electrode 20. Separator 30 separates positive electrode 10 and negative electrode 20 from each other. Separator 30 is porous. Separator 30 allows an electrolyte solution to pass therethrough. Separator 30 is electrically insulative. Separator 30 may be composed of, for example, polyolefin. It should be noted that when the electrolyte is a solid, the electrolyte may function as the separator.

«Electrolyte»

The electrolyte includes at least one selected from a group consisting of a liquid electrolyte (electrolyte solution or ionic liquid), a gel electrolyte, and a solid electrolyte. In the present embodiment, the electrolyte solution is described as just an example. The electrolyte solution includes a solvent and a supporting electrolyte. The electrolyte solution may further include any additive agent. The supporting electrolyte is dissolved in the solvent. The solvent is aprotic. For example, the solvent may include at least one selected from a group consisting of ethylene carbonate (EC), propylene carbonate (PC), ethyl methyl carbonate (EMC), dimethyl carbonate (DMC), and diethyl carbonate (DEC). The supporting electrolyte is dissolved in the solvent. The supporting electrolyte can include any component. For example, the supporting electrolyte may include at least one selected from a group consisting of $LiPF_6$, $LiBF_4$, and $LiN(FSO_2)_2$.

<Method of Producing Positive Electrode>

Figure 7:
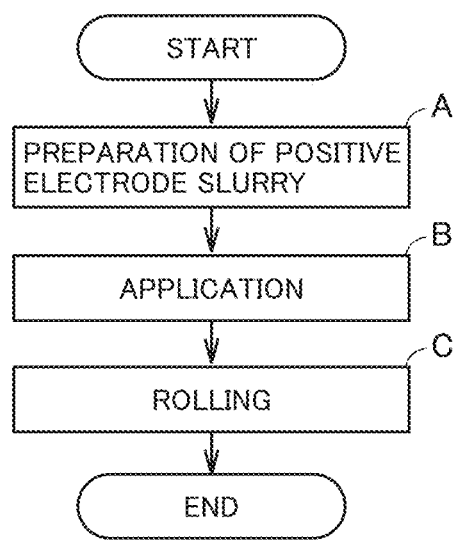
FIG. 7 is a schematic flowchart of a method of producing the positive electrode in the present embodiment.

FIG. 7 is a schematic flowchart of a method of producing the positive electrode in the present embodiment.

The method of producing the positive electrode in the present embodiment includes: "(A) preparation of a slurry"; "(B) application"; and "(C) rolling". In the present embodiment, positive electrode 10 for a lithium ion battery is produced.

«(A) Preparation of Positive Electrode Slurry»

The method of producing the positive electrode in the present embodiment includes preparing a positive electrode slurry including the positive electrode active material powder.

Details of the positive electrode active material powder are as described above. Each of the first particle group and the second particle group can be independently synthesized by, for example, a coprecipitation method. For example, the size of the single-particle, the size of the primary particle, the size of the aggregated particle, and the like can be adjusted by synthesis conditions, pulverization conditions, and the like. For example, in the above-described tumbling fluidized-bed dry mixing device, the first particle group and the second particle group are mixed to allow the mixed powder to have an $ff_c$ of more than or equal to 2.9. In this way, the positive electrode active material powder can be prepared.

The positive electrode slurry is prepared by dispersing the positive electrode active material powder in a dispersion medium. In the present embodiment, any mixing device, stirring device, or dispersing device may be used. For example, a planetary mixer or the like may be used. In addition to the positive electrode active material powder, the positive electrode slurry may be prepared to further include a conductive material, a binder, and the like. Details of the conductive material and the binder are as described above. The dispersion medium is selected in accordance with the type of binder or the like. The dispersion medium may include, for example, N-methyl-pyrrolidone (NMP) or the like. For example, the viscosity of the positive electrode slurry may be adjusted by an amount of use of the dispersion medium.

«(B) Application»

The method of producing the positive electrode in the present embodiment includes forming positive electrode active material layer 12 by applying the positive electrode slurry onto a surface of positive electrode substrate 11.

Positive electrode substrate 11 is prepared. Details of positive electrode substrate 11 are as described above. An application device is prepared. In the present embodiment, any application device can be used. For example, a slot die coater, a gravure coater, or the like may be used. The positive electrode slurry is applied onto the surface of positive electrode substrate 11 by the application device. The applied film is dried by hot air, for example. In this way, positive electrode active material layer 12 can be formed.

«(C) Rolling»

The method of producing the positive electrode in the present embodiment includes producing positive electrode

10 by rolling positive electrode active material layer 12 and positive electrode substrate 11

A rolling machine is prepared. The rolling machine includes two rotatable rolls. A workpiece uniting positive electrode active material layer 12 with positive electrode substrate 11 is caused to pass through a gap between the rolls of the rolling machine. In this way, positive electrode active material layer 12 and positive electrode substrate 11 are rolled to produce positive electrode 10.

In the present embodiment, it is expected that positive electrode active material layer 12 is compressed to have a high density while suppressing elongation of positive electrode substrate 11. This is because the positive electrode active material powder exhibits a high packing characteristic during the rolling. For example, the rolling may be performed such that the elongation of positive electrode 10 after the rolling becomes less than or equal to 2.1% with respect to the state of positive electrode 10 before the rolling. The elongation ($\delta$) of positive electrode 10 is expressed by the following formula: "$\delta$ (%)=($L_1$−$L_0$)/$L_0$×100". In the formula, "$L_0$" represents a dimension in MD (machine direction) before the rolling. "$L_1$" represents a dimension in MD after the rolling. As the elongation is smaller, positive electrode 10 tends to be less likely to be broken in a subsequent process (for example, roll-to-roll transfer or the like). The elongation may be less than or equal to 1.5% or may be less than or equal to 1.0%, for example.

A raw sheet of positive electrode 10 is produced by the rolling. The raw sheet can be cut into a predetermined planar size in accordance with the specification of battery 100.

[Examples]

The following describes an example of the present disclosure (hereinafter, also referred to as "the present example"). However, the scope of claims is not limited by the description below.

Test batteries No. 1 to No. 12 were produced as follows.

<No. 1>

«Production of Positive Electrode Active Material Powder»

(Preparation of First Particle Group)

A first composite hydroxide was synthesized by the coprecipitation method. The chemical composition of the first composite hydroxide is represented by $Ni_{0.8}Co_{0.1}Mn_{0.1}(OH)_2$. The first composite hydroxide was subjected to heat treatment. A heat treatment temperature was 500° C. In this way, a first calcined material was prepared.

Lithium hydroxide and the first calcined material were mixed in a molar ratio of "the lithium hydroxide/the first calcined material=1.05/1" to prepare a first mixture. The first mixture was subjected to heat treatment in an oxygen atmosphere. In this way, a second calcined material was prepared. A heat treatment temperature was 850° C. A heat treatment time was 72 hours. The second calcined material was pulverized in a wet manner by a ball mill. After the pulverization, the second calcined material was dried. After the drying, the second calcined material was subjected to heat treatment. In this way, the first particle group was prepared. A heat treatment temperature was 750° C. A heat treatment time was 10 hours.

The D50 of the first particle group was 3.6 μm. The first particle group was observed by a SEM. The first particle group consisted essentially of the single-particles. The first maximum diameter of each of the single-particles was 2.5 μm to 3.8 μm.

(Preparation of Second Particle Group)

A second composite hydroxide was synthesized by the coprecipitation method. The chemical composition of the second composite hydroxide is represented by $Ni_{0.8}Co_{0.1}Mn_{0.1}(OH)_2$. Lithium hydroxide and the second composite hydroxide were mixed in a molar ratio of "the lithium hydroxide/the second composite hydroxide=1.05/1" to prepare a second mixture. The second mixture was subjected to heat treatment in an oxygen atmosphere. In this way, a third calcined material was prepared. A heat treatment temperature was 800° C. A heat treatment time was 10 hours. In an agate mortar, the third calcined material was pulverized. In this way, the second particle group was prepared.

The particle size distribution of the second particle group was measured. The particle size distribution had a D50 of 12 μm, had a D70 of 14 μm, and had a D30 of 10 μm. The second particle group was observed by a SEM. The second particle group consisted essentially of the aggregated particles. In each of the aggregated particles, the average value of the second maximum diameters of the primary particles was 0.13 μm.

(Mixing)

A tumbling fluidized-bed dry mixing device was prepared as a mixing device (see FIG. 3). The first particle group and the second particle group were introduced into a container to attain a mixing fraction of 25%. The powder was mixed while supplying hot air into the container. In this way, the positive electrode active material powder was prepared. The temperature of the hot air (the temperature of the supplied air) was 150° C. A mixing time was 20 min.

(Measurement of Water Content Value)

After the mixing, the water content of the positive electrode active material powder was measured by a Karl Fischer moisture meter. Measurement conditions are as described above. The water content is shown in Table 1.

(Measurement of $ff_c$)

The $ff_c$ of the positive electrode active material powder was measured in the above-described procedure. The $ff_c$ is shown in Table 1.

«Production of Positive Electrode»

(Preparation of Positive Electrode Slurry)

The positive electrode active material powder, a conductive material (acetylene black), a binder (PVdF), and a dispersion medium (NMP) were mixed to prepare the positive electrode slurry. The mass ratio of the solid contents thereof was as follows: "the positive electrode active material powder/the conductive material/the binder=96.3/2.5/1.2".

(Application)

An Al alloy foil (alloy number: 3003; thickness: 13 μm) was prepared as the positive electrode substrate. The positive electrode slurry was applied onto each of the surfaces (front and rear surfaces) of the positive electrode substrate and was dried to form the positive electrode active material layer.

(Rolling)

The positive electrode active material layer and the positive electrode substrate were rolled by a rolling machine. A target density of the positive electrode active material layer after rolling was 3.7 g/cm³. Roll linear pressure and roll gap were adjusted in accordance with the target density. By the rolling, the positive electrode was produced. The positive electrode was cut into a predetermined planar size.

In order to evaluate a packing characteristic during the rolling, the density of the positive electrode active material layer when the elongation of the positive electrode after the rolling was 1% with respect to the state of the positive electrode before the rolling was measured. The density is shown in Table 1.

«Production of Lithium Ion Battery»

A negative electrode was prepared. The negative electrode active material was graphite. A separator was prepared. The separator was a porous sheet composed of polyolefin. The positive electrode, the separator, and the negative electrode were layered such that the separator separates the positive electrode and the negative electrode from each other. In this way, an electrode assembly was formed. As an exterior package, a pouch composed of a laminate film was prepared. The electrode assembly was stored in the exterior package. An electrolyte solution was injected into the exterior package. After the injection of the electrolytic solution, the exterior package was sealed. In this way, a test battery (pouch-shaped lithium ion battery) was produced.

The test battery in the present example was designed to have an energy density of 650 Wh/L. In the present example, the energy density of the test battery can be changed in accordance with the density of the positive electrode active material layer. The energy density is shown in Table 1.

In a thermostatic chamber set at 60° C., charging/discharging of the test battery was performed for 500 cycles. A resistance increase ratio (percentage) was calculated by dividing a battery resistance after the 500 cycles by the initial battery resistance. The resistance increase ratio is shown in Table 1. It is considered that as the resistance increase ratio is lower, cycle durability is more excellent.

<No. 2>

The positive electrode active material powder, the positive electrode, and the test battery were produced in the same manner as in No. 1 except that the mixing fraction and the temperature of the supplied air were changed as shown in Table 1.

<No. 3>

The positive electrode active material powder, the positive electrode, and the test battery were produced in the same manner as in No. 1 except that the mixing fraction was changed and no air was supplied during the powder mixing as shown in Table 1.

<No. 4 to No. 6>

The positive electrode active material powder, the positive electrode, and the test battery were produced in the same manner as in No. 1 except that the mixing fraction was changed as shown in Table 1.

<No. 7 to No. 9>

The positive electrode active material powder, the positive electrode, and the test battery were produced in the same manner as in No. 1 except that the chemical compositions of the single-particles and the aggregated particles were changed and the mixing fraction was changed as shown in Table 1. In the column of the composition in Table 1, for example, "8/1/1" indicates that the composition ratio of Ni, Co and Mn in Li(NiCoMn)O$_2$ is "Ni/Co/Mn=0.8/0.1/0.1" in molar ratio.

<No. 10>

The positive electrode active material powder, the positive electrode, and the test battery were produced in the same manner as in No. 3 except that the second particle group was used solely as the positive electrode active material powder.

<No. 11>

The positive electrode and the test battery were produced in the same manner as in No. 6 except that an Al alloy foil (alloy number: 1N30) was used as the positive electrode substrate. In the positive electrode of No. 11, the average number of grain boundaries of the Al alloy foil (alloy number: 1N30) was 10. In the positive electrode of No. 6 or the like, the average number of grain boundaries of the Al alloy foil (alloy number: 3003) was 30 to 50.

<No. 12>

The positive electrode active material powder, the positive electrode, and the test battery were produced in the same manner as in No. 3 except that the mixing time was changed.

TABLE 1

| | Positive Electrode Active Material Powder | | | | | | Positive Electrode | | |
|---|---|---|---|---|---|---|---|---|---|
| | First Particle Group (Single-Particles) | | Second Particle Group (Aggregated Particles) | Mixing Condition | | | | Positive Electrode | Battery |
| | | | | | | | | Active | After 500 |
| | | | | Temperature | Water Content | Flow Function | Substrate | Material | Initial Cycles |
| No. | Composition Ni/Co/Mn | Mixing Fraction[1] [%] | Composition Ni/Co/Mn | of Supplied Air [° C.] | (Mass Fraction) [ppm] | Coefficient $ff_c$ [—] | Alloy Number | Layer Density[2] [g/cm$^3$] | Energy Density [Wh/L] | Resistance Increase Ratio [%] |
|---|---|---|---|---|---|---|---|---|---|---|
| 1 | 8/1/1 | 25 | 8/1/1 | 150 | 680 | 2.9 | 3003 | 3.67 | 664 | 233 |
| 2 | 8/1/1 | 30 | 8/1/1 | Normal Temperature | 690 | 3.5 | 3003 | 3.69 | 667 | 176 |
| 3 | 8/1/1 | 50 | 8/1/1 | None | 1070 | 2.9 | 3003 | 3.53 | 638 | 321 |
| 4 | 8/1/1 | 50 | 8/1/1 | 150 | 700 | 5.1 | 3003 | 3.75 | 678 | 134 |
| 5 | 8/1/1 | 60 | 8/1/1 | 150 | 720 | 4.7 | 3003 | 3.72 | 673 | 125 |
| 6 | 8/1/1 | 75 | 8/1/1 | 150 | 730 | 4.3 | 3003 | 3.58 | 647 | 208 |
| 7 | 6/2/2 | 65 | 7/2/1 | 150 | 760 | 4.8 | 3003 | 3.62 | 622 | 168 |
| 8 | 6/2/2 | 20 | 6/2/2 | 150 | 970 | 3.0 | 3003 | 3.65 | 578 | 132 |
| 9 | 6/2/2 | 70 | 8/1/1 | 150 | 920 | 8.2 | 3003 | 3.61 | 574 | 227 |
| 10 | — | 0 | 8/1/1 | Normal Temperature | 840 | 1.3 | 3003 | 3.42 | 618 | 335 |
| 11 | 8/1/1 | 75 | 8/1/1 | 150 | 730 | 4.3 | 1N30 | 3.46 | 626 | 343 |
| 12 | 8/1/1 | 50 | 8/1/1 | None | 2205 | 1.8 | 3003 | 3.45 | 628 | 436 |

[1]The "mixing fraction" represents the mass fraction of the first particle group with respect to the total of the first particle group and the second particle group.
[2]The "density" represents a value when the elongation of the positive electrode is 1%.

<Evaluation Results>

As shown in Table 1, it is observed that when the $ff_c$ is more than or equal to 2.9, the density of the positive electrode active material layer tends to be improved. This is presumably due to the following reason: when the $ff_c$ is more than or equal to 2.9, the positive electrode active material powder exhibits a high packing characteristic during rolling.

It is observed that as the density of the positive electrode active material layer when the elongation of the positive electrode is 1% is higher (as the packing characteristic of the positive electrode active material powder is higher), the resistance increase ratio after the cycles tends to be lower. It is considered that since the packing characteristic of the positive electrode active material powder is excellent, occurrence of cracks of the second particles (aggregated particles) during rolling is reduced. It is considered that when an aggregated particle is cracked during rolling, the specific surface area (i.e., reaction area) of the positive electrode active material is increased, with the result that the resistance increase ratio after the cycles becomes high.

The present embodiment and the present example are illustrative in any respects. The present embodiment and the present example are not restrictive. For example, it is initially expected to extract freely configurations from the present embodiment and the present example and combine them freely.

The technical scope defined by the terms of the claims encompasses any modification within the meaning equivalent to the terms of the claims. The technical scope defined by the terms of the claims also encompasses any modification within the scope equivalent to the terms of the claims.

What is claimed is:

1. A positive electrode active material powder for a lithium ion battery, the positive electrode active material powder comprising:
    a first particle group; and
    a second particle group, wherein
    the first particle group consists of a plurality of first particles,
    each of the plurality of first particles includes 1 to 10 single-particles,
    each of the single-particles has a first maximum diameter of more than or equal to 0.5 μm,
    the first maximum diameter represents a distance between two most distant points on a contour line of the single-particle,
    the second particle group consists of a plurality of second particles,
    each of the plurality of second particles includes an aggregated particle,
    the aggregated particle is formed by aggregation of 50 or more primary particles,
    each of the primary particles has a second maximum diameter of less than 0.5 μm,
    the second maximum diameter represents a distance between two most distant points on a contour line of the primary particle,
    the positive electrode active material powder has a flow function coefficient of more than or equal to 2.9 and less than or equal to 5.1,
    the flow function coefficient is a ratio of a maximum principal stress to a uniaxial collapse stress,
    the uniaxial collapse stress and the maximum principal stress are measured by a direct shear test for powders,
    the positive electrode active material powder has a water content of less than or equal to 970 ppm, and
    a mass fraction of the first particle group with respect to a total of the first particle group and the second particle group is 20% to 75%.

2. The positive electrode active material powder according to claim 1, wherein the single-particle includes a first lamellar metal oxide,
the first lamellar metal oxide is represented by the following formula (1):

$$Li_{1-a1}Ni_{x1}Me^1_{1-x1}O_2 \qquad (1),$$

where
a1 satisfies a relation of $-0.3 \leq a1 \leq 0.3$,
x1 satisfies a relation of $0.6 \leq x1 < 1.0$, and
$Me^1$ represents at least one selected from a group consisting of Co, Mn, Al, Zr, Ti, V, Cr, Fe, Cu, Zn, Mo, Sn, Ge, Nb, and W,
the primary particle includes a second lamellar metal oxide, and
the second lamellar metal oxide is represented by the following formula (2):

$$Li_{1-a2}Ni_{x2}Me^2_{1-x2}O_2 \qquad (2),$$

where
a2 satisfies a relation of $-0.3 \leq a2 \leq 0.3$,
x2 satisfies a relation of $0.7 \leq x2 \leq 1.0$, and
$Me^2$ represents at least one selected from the group consisting of Co, Mn, Al, Zr, Ti, V, Cr, Fe, Cu, Zn, Mo, Sn, Ge, Nb, and W.

3. A positive electrode for a lithium ion battery, the positive electrode comprising:
    a positive electrode active material layer; and
    a positive electrode substrate, wherein
    the positive electrode active material layer is formed on a surface of the positive electrode substrate,
    the positive electrode active material layer includes the positive electrode active material powder according to claim 1,
    the positive electrode substrate includes an aluminum alloy foil,
    the positive electrode substrate has a tensile strength of 250 MPa to 350 MPa, and
    30 to 50 crystal grain boundaries exist on average in a thickness direction of the aluminum alloy foil.

4. A lithium ion battery comprising the positive electrode according to claim 3.

5. A method of producing a positive electrode for a lithium ion battery, the method comprising:
    preparing a positive electrode slurry including the positive electrode active material powder according to claim 1;
    forming a positive electrode active material layer by applying the positive electrode slurry onto a surface of a positive electrode substrate; and
    producing the positive electrode by rolling the positive electrode active material layer and the positive electrode substrate.

6. The method according to claim 5, wherein
in the preparing of the positive electrode slurry including the positive electrode active material powder, a hot air is supplied during mixing, through a tumbling fluidized-bed dry mixing device, to prepare the positive electrode active material powder having the water content of less than or equal to 970 ppm.

7. The positive electrode active material powder according to claim 1, wherein
    the positive electrode active material powder is obtained by mixing the first particle group and the second particle in an airflow having a temperature of 80° C. to 150° C.;
    the mass fraction of the first particle group with respect to the total of the first particle group and the second particle group is 20% to 65%; and the positive electrode active material powder has the flow function coefficient of more than or equal to 3.0 and less than or equal to 5.1.

8. The positive electrode active material powder according to claim 7, wherein
the airflow has the temperature of 120° C. to 150° C.

9. The positive electrode active material powder according to claim 7, wherein
the positive electrode active material powder has the flow function coefficient of more than or equal to 3.0 and less than or equal to 4.8.

10. The positive electrode active material powder according to claim 7, wherein
the mass fraction of the first particle group with respect to the total of the first particle group and the second particle group is 25% to 65%.

11. The positive electrode active material powder according to claim 7, wherein
the mass fraction of the first particle group with respect to the total of the first particle group and the second particle group is 30% to 65%.

12. The method of producing the positive electrode for the lithium ion battery according to claim 5, wherein
the positive electrode active material powder is obtained by mixing the first particle group and the second particle in an airflow having a temperature of 80° C. to 150° C.;
the mass fraction of the first particle group with respect to the total of the first particle group and the second particle group is 20% to 65%; and
the positive electrode active material powder has the flow function coefficient of more than or equal to 3.0 and less than or equal to 5.1.

13. The method of producing the positive electrode for the lithium ion battery according to claim 12, wherein
the airflow has the temperature of 120° C. to 150° C.

14. The method of producing the positive electrode for the lithium ion battery according to claim 13, wherein
the positive electrode active material powder has the flow function coefficient of more than or equal to 3.0 and less than or equal to 4.8.

15. The method of producing the positive electrode for the lithium ion battery according to claim 13, wherein
the mass fraction of the first particle group with respect to the total of the first particle group and the second particle group is 25% to 65%.

16. The method of producing the positive electrode for the lithium ion battery according to claim 13, wherein
the mass fraction of the first particle group with respect to the total of the first particle group and the second particle group is 30% to 65%.

* * * * *